Figure 1:
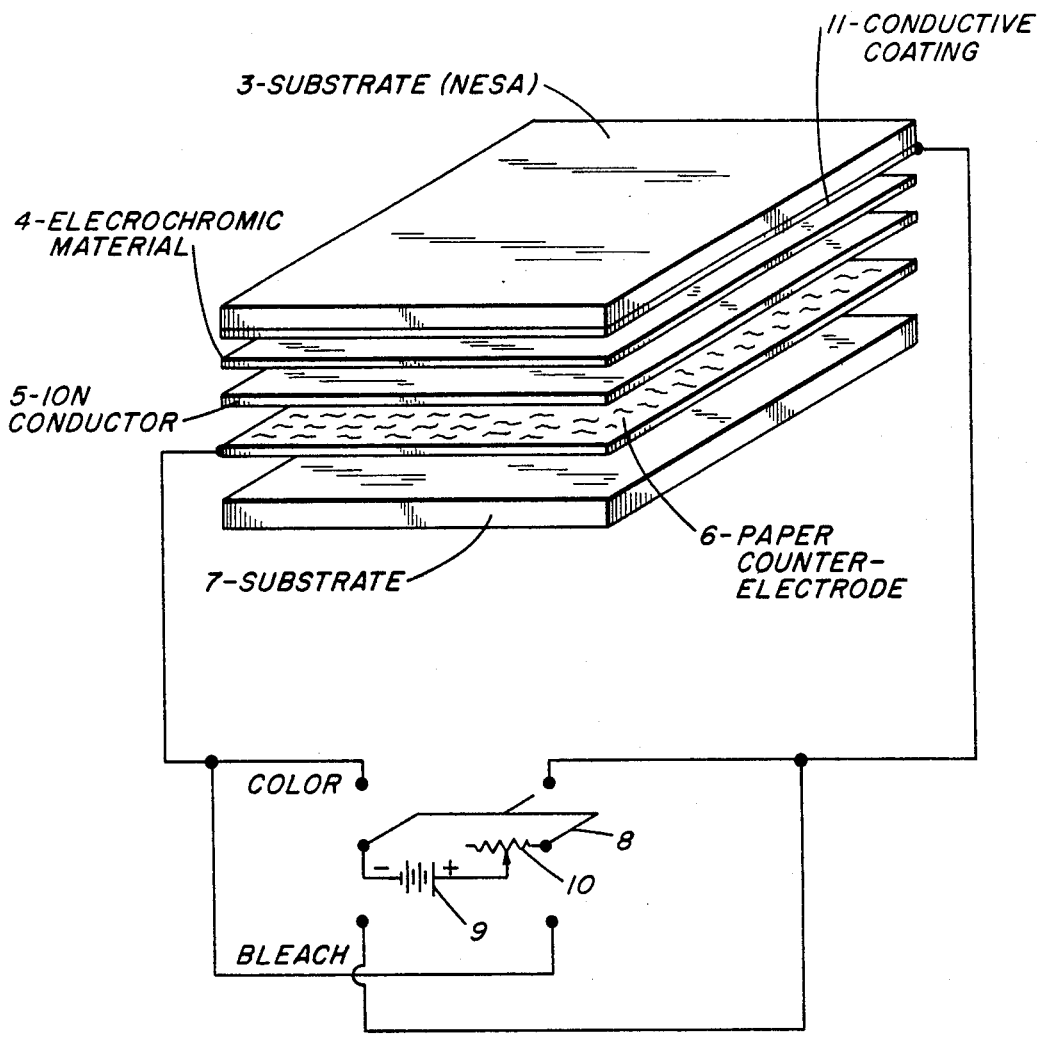

United States Patent [19]

Giglia

[11] 4,088,395

[45] May 9, 1978

[54] PAPER COUNTER-ELECTRODE FOR ELECTROCHROMIC DEVICES

[75] Inventor: Robert Domenico Giglia, Rye, N.Y.

[73] Assignee: American Cyanamid Company, Stamford, Conn.

[21] Appl. No.: 690,446

[22] Filed: May 27, 1976

[51] Int. Cl.² .............................................. G02F 1/36
[52] U.S. Cl. ................................................. 350/357
[58] Field of Search ............. 350/160; 29/25.14, 25.17

[56] References Cited

U.S. PATENT DOCUMENTS

| 3,712,047 | 1/1973 | Girard ........................... 350/160 LC |
| 3,807,832 | 4/1974 | Castellion ....................... 350/160 R |

Primary Examiner—William L. Sikes
Attorney, Agent, or Firm—Robert J. Feltovic; H. G. Jackson; Bruce F. Jacobs

[57] ABSTRACT

Disclosed is a method for forming a counter-electrode in a variable light modulating device of the electrochromic type. The counter-electrode is a paper composition of fibrous pulp and carbon.

16 Claims, 1 Drawing Figure

PAPER COUNTER-ELECTRODE FOR ELECTROCHROMIC DEVICES

The invention relates to electro-optical devices whose electromagnetic radiation absorption characteristics can be selectively altered by the influence of a suitably controlled electric field. More particularly, the invention relates to variable light transmission devices which contain a layer of persistent electrochromic material as a light modulating material, and a counter-electrode separated by an ion conducting material. In specific, the invention is directed to a simplified, effective counter-electrode for eletrochromic devices and a method for forming such counter-electrodes.

Electrochromic devices are known in the art and are described in prior, commonly assigned patents, such as U.S. Pat. Nos. 3,521,941, 3,704,057, 3,708,220, 3,843,232, 3,847,468 and 3,879,108. These patents disclose suitable materials and methods for forming the overall electrochromic device of the present invention. These patents further show various counter-electrode arrangements which previously have been utilized. U.S. Pat. No. 3,521,941 utilizes a gold film counter-electrode, while U.S. Pat. No. 3,843,232 introduces a counter-electrode made from palladium. Another development is shown in U.S. Pat. No. 3,704,057, wherein electrochromic material is used for the counter-electrode as well as for the display area.

Although the prior counter-electrode structures have successfully operated in electrochromic devices, the present counter-electrode invention is designed to provide improved reversibility and longer life at a comparably low cost.

The foregoing and other features, objects and advantages of the invention will become more apparent by reference to the following more detailed description read in conjunction with the accompanying drawing.

IN THE DRAWING

FIG. 1 is an exploded perspective view of an electrochromic device including the paper counter-electrode of the present invention.

As shown in FIG. 1, the preferred embodiment of the electrochromic display is a sandwich arrangement of a transparent substrate 3 coated with a conductive material 11, such as tin oxide. This substrate and conductive coating may conveniently be provided as a unit by commercially available NESA glass, which is a product having a transparent coating of conductive tin oxide on one surface of a glass sheet. The electrochromic material layer 4 may be deposited on the tin oxide layer by known vacuum deposition techniques. Ion conducting layer 5 may consist of a liquid, semi-solid or solid as disclosed in the prior art cited.

In accordance with the present invention, a paper electrode 6 is utilized as the counter-electrode. Substrate 7 may be glass, metal or plastic, and the like and need not be transparent, depending on the desired product application. The paper electrode may be bonded to the substrate by means of an adhesive. If the adhesive is electrically conductive and the substrate also is electrically conductive, electrical connection may be more conveniently made to the substrate rather than to the paper electrode directly.

The paper counter-electrode basically is a carbon-filled fibrous sheet. A preferred fiber used is an acrylic fiber and a fluorocarbon resin such as a Teflon (polytetrafluoroethylene) binder may be incorporated to provide a more cohesive sheet. An electrochromic material may also be incorporated on the sheet. A preferable material is $WO_3$.

The following is an example of a paper counter-electrode preparation:

EXAMPLE 1

A mixture of 160 ml of 1.17% suspension of Cyanamid T98 acrylic fiber pulp in $H_2O$, 3.0 gm of United Carbon 6310-4 (a high surface area carbon powder), 2.0 ml of 0.2% aqueous solution of Cyanamid M1653C flocculating agent (a highly active, high molecular weight liquid cationic flocculant), 1.0 ml of 10% Jefferson Chemical Company Surfonic N120 non-ionic surface active agent (reaction product of nonyl phenol and ethylene oxide), 2.0 ml of 60% Teflon TFE 30-B (polytetrafluoroethylene) and 200 ml of $H_2O$ was blended at low speed for 15 seconds followed by 15 seconds of high speed blending. A sheet of carbon impregnated fibrous acrylic material was then formed by standard papermaking procedure and then dried under pressure at 70° C. to 120° C. The dried sheet next was soaked for 2 hours in 10% $H_2SO_4$ in isopropanol in order to remove impurities introduced in processing. Following this soaking, the sheet further was rinsed in isopropanol for 1 hour and vacuum dried for ½ hour at 80° C.

In some electrochromic applications, it may be preferable to include electrochromic material in the counterelectrode. Accordingly, the following example of application procedure may be used:

EXAMPLE 2

After vacuum drying the isopropanol rinsed sheet, as in Example 1, both sides of the sheet were coated with a solution of electrochromic $WO_3$ in $NH_4OH$. The coated sheet then was vacuum dried at 80° C. for 1 hour. The sheet was then soaked in 10% $H_2SO_4$ in isopropanol for 1 hour. Finally, the sheet was rinsed in isopropanol for 2 hours and vacuum dried at 80° C.

The sheet was pressed at 1.2 kg/cm$^2$ to produce a 0.012 inch thick sheet which can be cut to desired size.

In comparative testing, the paper counter-electrode, prepared as described above, demonstrated improved results over prior known counter-electrodes. For example, when the present invention was substituted for the counter-electrode material as incorporated in the electrochromic mirror device shown in U.S. Pat. No. 3,844,636, switching speed was augmented from 30 seconds to color and 1½ minutes for erasure to only 10 seconds to color and less than 1 minute to erase.

Further, when the invented paper counter-electrode was used to replace the common counter-electrodes in the electrochromic numeric displays as shown in U.S. Pat. Nos. 3,839,857 and 3,827,784, life-time was enhanced from $4 \times 10^6$ cycles to beyond $7 \times 10^6$ cycles without failure.

I claim:

1. In a variable light modulating device of the electrochromic type having an arrangement comprising a light transmitting substrate having a persistent electrochromic material as a light modulating material and a counter-electrode separated from said electrochromic material by an ion-conducting material, an improved counter-electrode structure consisting essentially of a paper sheet including a web of filaments permeated with carbon.

2. The combination according to claim 1, wherein said filaments are acrylic fibers.

3. The combination according to claim 1 wherein said paper sheet includes a fluorocarbon resin binder material.

4. The combination according to claim 3 wherein said paper sheet includes an electrochromic material.

5. The combination according to claim 4 wherein said electrochromic material is $WO_3$.

6. A process for making a paper counter-electrode for an electrochromic variable light modulating device comprising:

blending an aqueous suspension of fibrous material with powdered carbon to form an aqueous mixture, forming a sheet of the solids from said aqueous mixture, drying and pressing said sheet to form a paper material to be used as a counter-electrode for an electrochromic device.

7. The process of claim 6 wherein said fibrous material is an acrylic fiber.

8. The process of claim 7 wherein a binder is blended into said aqueous mixture so as to form a more cohesive paper sheet.

9. The process of claim 8 wherein said binder is a fluorocarbon resin.

10. The process of claim 9 wherein a flocculating agent and a surfactant are blended into said aqueous mixture.

11. The process of claim 10 including the additional finishing steps of washing the dried and pressed paper sheet in acid and alcohol, and drying the washed sheet.

12. The process of claim 9 including the additional step of applying an electrochromic material to the washed sheet.

13. The process of claim 12 wherein said electrochromic material is $WO_3$.

14. A paper counter-electrode for an electrochromic light modulating device prepared according to the process of claim 6.

15. A paper counter-electrode for an electrochromic light modulating device prepared according to the process of claim 11.

16. A paper counter-electrode for an electrochromic light modulating device prepared according to the process of claim 12.

* * * * *